United States Patent
Reynolds et al.

[11] Patent Number: 5,978,547
[45] Date of Patent: Nov. 2, 1999

[54] HIGH-TURNDOWN DC MOTOR CONTROLLER AND METHOD

[75] Inventors: David L. Reynolds, Hirschthal, Switzerland; James T. Foley, Mickleton, N.J.

[73] Assignee: K-Tron Technologies, Inc., Pitman, N.J.

[21] Appl. No.: 09/063,236

[22] Filed: Apr. 20, 1998

[51] Int. Cl.[6] .................................................. H02P 5/17
[52] U.S. Cl. ........................ 388/811; 388/815; 318/245; 318/268
[58] Field of Search .................................. 318/244, 245, 318/268; 388/809, 811, 815, 816, 819, 821, 822, 823

[56] References Cited

U.S. PATENT DOCUMENTS

| | | | |
|---|---|---|---|
| 4,666,020 | 5/1987 | Watanabe | 318/801 X |
| 4,743,815 | 5/1988 | Gee et al. | 318/254 |
| 5,373,223 | 12/1994 | Akagi et al. | 318/722 |
| 5,460,244 | 10/1995 | Tanahashi | 318/434 X |
| 5,723,968 | 3/1998 | Sakurai | 318/802 |

OTHER PUBLICATIONS

Donald R. Moscato, "Fuzzy Logic Applied To Budgeting: An Intuitive Approach To Coping With Uncertainty (New)", Chapter 28A.

Donald R. Moscato, "Financial Modeling—What It Is and What the Risks Are", Hagan School of Business Administration of Iona College, Chapter 1.

*Primary Examiner*—Bentsu Ro
*Attorney, Agent, or Firm*—Ratner & Prestia

[57] ABSTRACT

A hybrid DC motor controller is provided for driving a DC motor. A switch is connected in series with the DC motor, and a capacitor is coupled in parallel with the DC motor and the switch. The speed of the DC motor is controlled by the capacitor voltage and the duty cycle of a pulse-width modulated (PWM) signal supplied to the switch. The hybrid controller combines a motor speed control loop with a PWM optimization loop. The motor speed control loop generates a PWM signal in response to the speed of the DC motor and conducts that PWM signal to the switch to control the DC motor. The PWM optimization loop includes a controller that is responsive to the PWM signal and an AC voltage signal. This controller compares the PWM signal with a PWM signal setpoint, and drives the PWM signal toward the PWM signal setpoint by adjusting the capacitor voltage in response to the comparison between the PWM signal and the PWM signal setpoint. The speed of the DC motor changes in response to the adjusted capacitor voltage, and the motor speed control loop changes the PWM signal in response to the changed motor speed. These adjustments have the cumulative effect of driving the PWM signal toward the PWM signal setpoint. The controller included in the PWM optimization loop controls a rectifier for selectively supplying a rectified voltage to the capacitor.

21 Claims, 3 Drawing Sheets

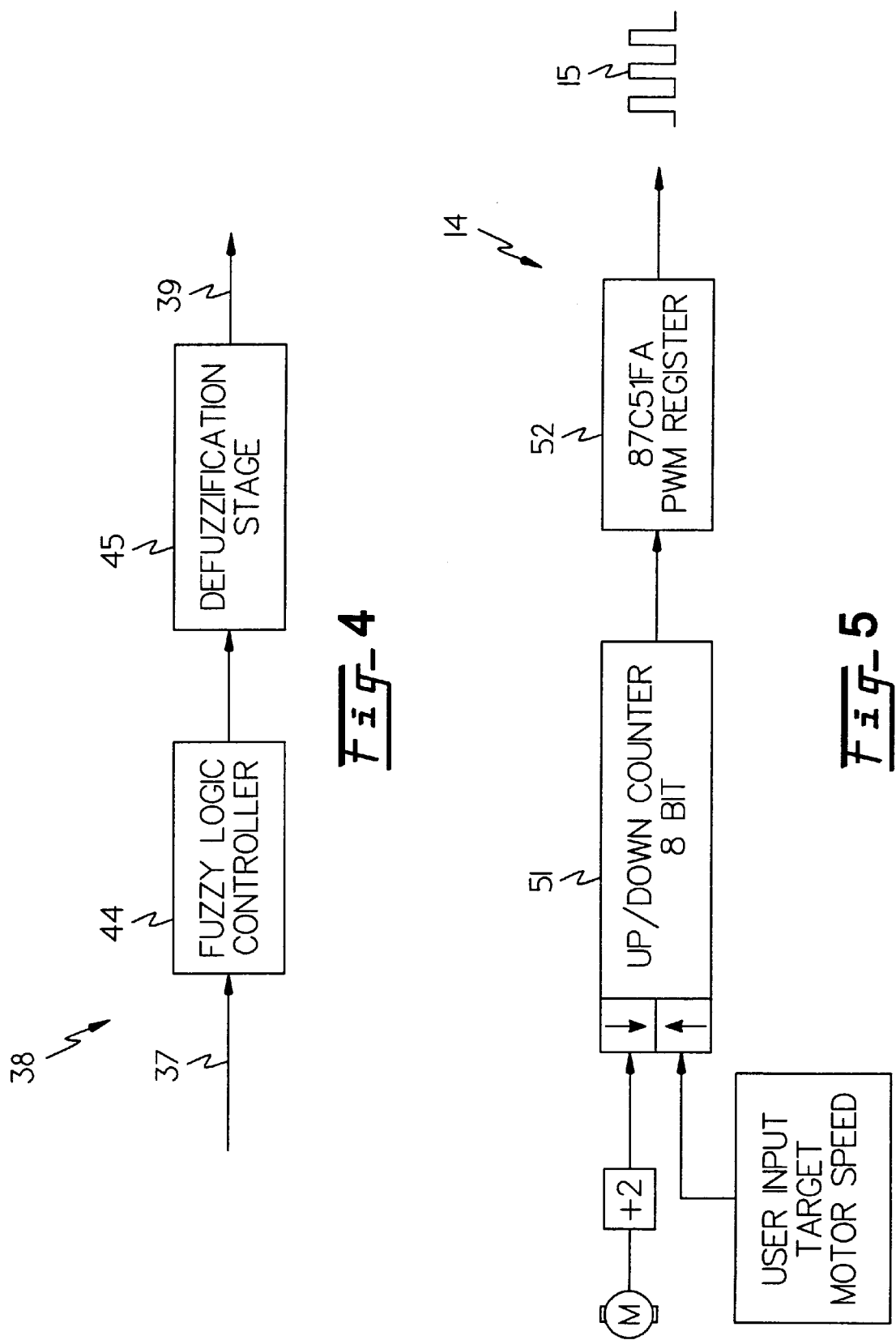

HIGH-TURNDOWN DC MOTOR CONTROLLER AND METHOD

FIELD OF THE INVENTION

This invention pertains generally to DC motor control, and specifically to DC motor controls for high-speed and power turndown applications.

BACKGROUND OF THE INVENTION

FIG. 1 illustrates a conventional DC chopper motor drive. A full-wave bridge rectifier 11 receives an AC line voltage and constantly provides a rectified DC voltage to charge one or more capacitors 12. Coupled in parallel with capacitors 12 are motor M and switch 13. Motor M is coupled in series with switch 13, which may be a solid-state device such as a MOSFET or IGBT. The state of switch 13 controls whether current flows through motor M, and the state of switch 13 is in turn controlled by a signal from a motor speed control loop 14. When switch 13 is closed, power flows from capacitors 12 to the armature of DC motor M. The speed of DC motor M is determined largely by the voltage across capacitors 12 and the duty cycle of the signal supplied to switch 13.

The motor speed control loop 14 controls switch 13 with a pulse-width modulated (PWM) signal, which determines the state of switch 13 and the operation of motor M. Typically, the shaft of motor M may be configured to transmit a pulse train whose frequency indicates the speed at which the shaft is rotating. Other suitable approaches may utilize motor speed feedback means such as an analog tachometer or an encoder. The motor speed control loop 14 may function by receiving a desired motor speed, synthesizing a pulse frequency corresponding to that desired motor speed, determining the current motor speed by analyzing the frequency of the pulse train from the motor shaft, and adjusting the PWM signal so that the actual motor speed approaches the desired motor speed.

Typically, the voltage on the capacitors 12 is unregulated, that is, the voltage is not externally controlled to be within a certain range. Thus, in FIG. 1, the voltage on capacitors 12 is determined largely by the magnitude of the AC line voltage. The motor speed control loop 14 can adjust the speed of the motor M only by adjusting the PWM signal. Should the capacitor voltage fluctuate for some reason, such as load variations, the motor speed control loop can react only by adjusting the PWM signal. For example, should the AC line voltage increase, the speed of DC motor M will also increase in response. The motor speed control loop 14 can compensate only by reducing the duty cycle of the PWM signal. Conversely, should the AC line voltage decrease, motor speed control loop 14 can compensate only by increasing the duty cycle of the PWM signal.

The PWM signal is a variable that is calculated and adjusted based upon several parameters, which include the capacitor voltage, the characteristics of the motor, and the operating load point of the motor. The characteristics of the motor and the operating load point of the motor are generally application-defined, and are constants in the control problem. Because the capacitor voltage is unregulated, the turndown of the motor controller is limited by the resolution of the PWM signal, the size of the motor compared to the capacity of the controller, and the line voltage.

The motor drive in FIG. 1 can suffer from limited turndown in certain situations. For example, if motor speed control loop 14 has already defined a high PWM duty cycle for a reason such as low capacitor voltage, and motor M receives a heavy load, then motor speed control loop 14 may not have enough operating range remaining to allow adjustment of the PWM signal to meet this heavy load. Accordingly, there exists a need in the art for a DC chopper motor controller having turndown that is not limited solely by the resolution of the PWM signal, the size of the motor compared to the capacity of the controller, and the line voltage. There exists a further need for a DC chopper motor controller that provides high turndown characteristics by keeping the PWM duty in the approximate middle of its range, thus allowing motor speed control loop 14 full flexibility in moving the PWM duty cycle to either extreme.

SUMMARY

Accordingly, a circuit for driving a DC motor, constructed in accordance with the present invention, includes a control switch adapted for connection in series with the DC motor to control current flow through the DC motor and means for supplying an AC voltage signal. This circuit also includes a rectifier for rectifying the AC voltage signal and a capacitor which is coupled in parallel with the DC motor and the control switch and is responsive to the rectified AC voltage signal. A voltage is developed across the capacitor which controls the speed of the DC motor. A circuit for driving a DC motor, constructed in accordance with the present invention, further includes means responsive to the DC motor for generating a pulse-width modulated (PWM) signal having a duty cycle related to the speed of the DC motor and conducting the PWM signal to the control switch to control the control switch. This circuit further includes a controller having a PWM signal setpoint and responsive to the PWM signal and the AC voltage signal for comparing the PWM signal with the PWM signal setpoint and controlling the voltage across the capacitor in response to the comparison between the PWM signal and the PWM signal setpoint.

BRIEF DESCRIPTION OF THE DRAWINGS

The invention is best understood from the following detailed description when read in connection with the accompanying drawings. Included in the drawing are the following figures:

FIG. 4 is a schematic diagram of the fuzzy logic subcomponent of the controller.

FIG. 5 is a schematic diagram of a motor speed control loop.

DETAILED DESCRIPTION OF THE EXEMPLARY EMBODIMENT

Figure 1:
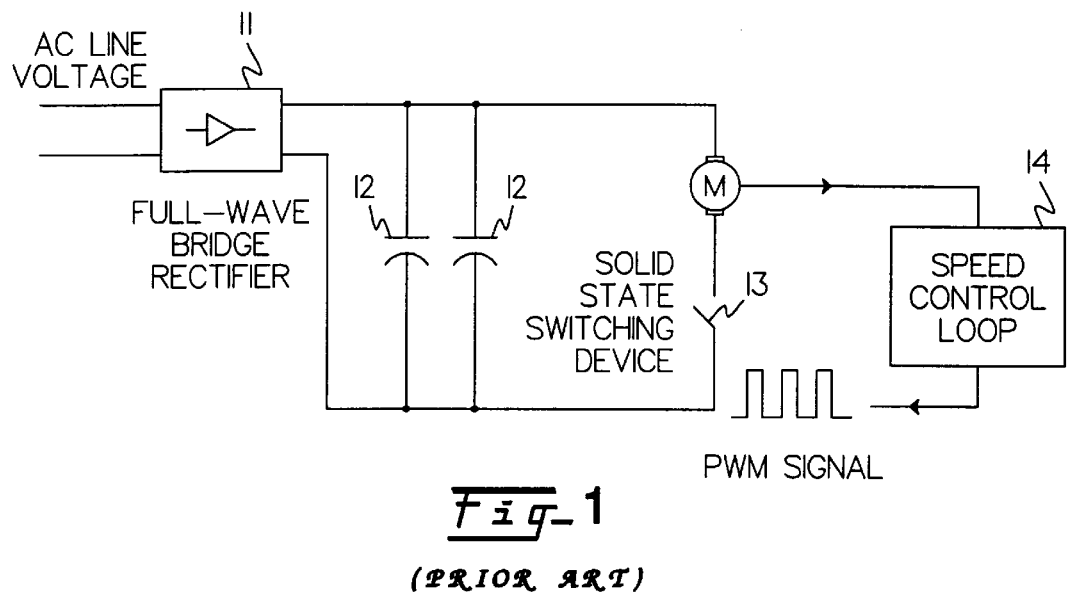
FIG. 1 is a schematic diagram of a conventional DC chopper motor controller.
Figure 2:
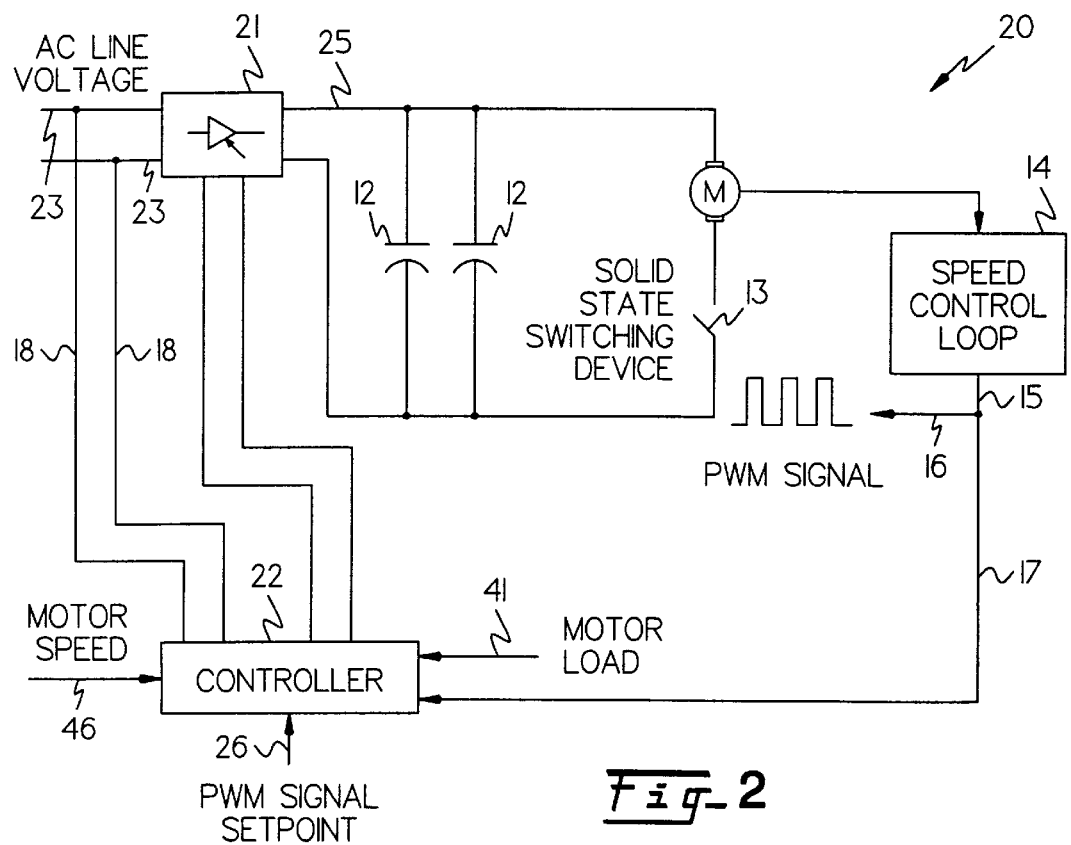
FIG. 2 is a schematic diagram of an embodiment of the invention.

Referring to FIG. 2, a circuit 20 for driving a DC motor, constructed in accordance with the present invention, includes a control switch 13 adapted for connection in series with the DC motor M to control current flow through the DC motor. Switch 13 may be a solid-state switching device such as a MOSFET or IGBT.

Also included in the circuit 20 are means for supplying an AC voltage signal. Such means are represented by the AC line voltage lines 23 and include the conductors and connectors necessary to interface the circuit to an AC source of power.

A circuit 20 for driving a DC motor, constructed in accordance with the present invention, further includes a rectifier 21 for rectifying the AC voltage signal. Rectifier 21 may be a silicon controlled rectifier (SCR), although other types of controllable rectifiers may be used.

The rectified AC voltage is conducted to one or more capacitors 12 which are coupled in parallel with the DC motor M and control switch 13. Capacitors 12 are responsive to the rectified AC voltage signal provided along line 25 and a voltage is developed across the capacitors which controls the speed of the DC motor.

Also included in the circuit 20 are means responsive to the DC motor for generating a pulse-width modulated (PWM) signal having a duty cycle related to the speed of the DC motor. Such means are represented by a speed control loop 14, which is illustrated in detail in FIG. 5.

As shown in FIG. 5, the shaft of the DC motor M may be encoded with teeth or other encoding devices to emit a number of pulses for each rotation, so that the motor speed may be calculated and monitored by counting the feedback pulses emitted over a time interval. Speed control loop 14 receives a target motor speed as input from a user. The speed control loop 14 then converts this target motor speed into a target pulse train having a target pulse frequency by multiplying the target motor speed in RPM by the number of teeth on the shaft of DC motor M. Thus, a target motor speed of 600 RPM on a DC motor having a shaft encoded with 100 teeth would correspond to a target pulse frequency of 60,000 pulses per minute (600 revolutions/minute * 100 pulses/revolution). The speed control loop 14 also receives a feedback pulse train from DC motor M that indicates the actual current speed of DC motor M. By comparing the frequency of the target pulse train to the frequency of the feedback pulse train, speed control loop 14 can determine whether the current speed of the DC motor M matches the target motor speed input by the user.

The setpoint pulses and the feedback pulses may be routed to an 8-bit up-down counter 51 which, in turn, controls an 87C51FA PWM register 52. The 87C51FA PWM register 52 generates the PWM signal along a line 15. The up-down counter 51 may be configured so that the target pulses increment the counter, and so that the feedback pulses decrement the counter.

If the frequency of the target pulses equals the frequency of the feedback pulses, the value of counter 51 sees no net change and there is no change in the PWM signal. If the frequency of the target pulses exceeds the frequency of the feedback pulses, counter 51 will be incremented and the duty cycle of the PWM signal will be increased. If the frequency of the target pulses is less than the frequency of the feedback pulses, counter 51 will be decremented and the duty cycle of the PWM signal will be decreased. In this manner, the motor speed control loop controls the PWM signal supplied along line 15 by constantly comparing the frequency of the setpoint signals to the frequency of the feedback signals.

As shown in FIG. 2, the PWM signal is conducted along a line 16 to control switch 13, such that the PWM signal controls the control switch 13. When control switch 13 is closed, current is conducted through the motor M.

A circuit 20 for driving a DC motor, constructed in accordance with the present invention, further includes a controller 22 having a PWM signal setpoint introduced along a line 26. This PWM signal setpoint represents the desired duty cycle at which the DC motor M should operate. Typically, for the highest turndown characteristic, this PWM signal setpoint should represent an approximately 50% duty cycle. It is to be understood that this 50% figure is not stated with absolute mathematical precision. Instead, some tolerance or deviation around the 50% figure is permissible without departing from the scope of the present invention. If the PWM signal setpoint is approximately 50%, a circuit, constructed in accordance with the present invention, has maximum flexibility, or turndown, to move the PWM duty cycle to either extreme to meet the demands placed on the DC motor M.

Controller 22 is responsive to the PWM signal conducted to the controller along a line 17 and to the AC voltage signal conducted to the controller along lines 18. Controller 22 compares the PWM signal conducted along line 17, which represents the current duty cycle of the DC motor M, with the PWM signal setpoint introduced along line 26, which represents the desired duty cycle of the motor M and controls the voltage across capacitor 12 in response to the comparison between the PWM signal and the PWM signal setpoint. If there is a difference between the PWM signal and the PWM signal setpoint, controller 22 drives the PWM signal toward the PWM signal setpoint by adjusting the voltage across capacitors 12. As controller 22 adjusts the voltage across capacitors 12, the speed of the motor M changes. Motor speed control loop 14 senses this change in motor speed and seeks to correct the motor speed to its former value by adjusting the PWM signal. This indirect manipulation of the PWM signal is the purpose of the controller 22.

For the embodiment of the invention being described, controller 22 also receives as input a signal on line 41 representing the power output of DC motor M and a signal on line 46 representing the speed of the DC motor M. The use of these signals will be described below in connection with FIG. 3.

Figure 3:
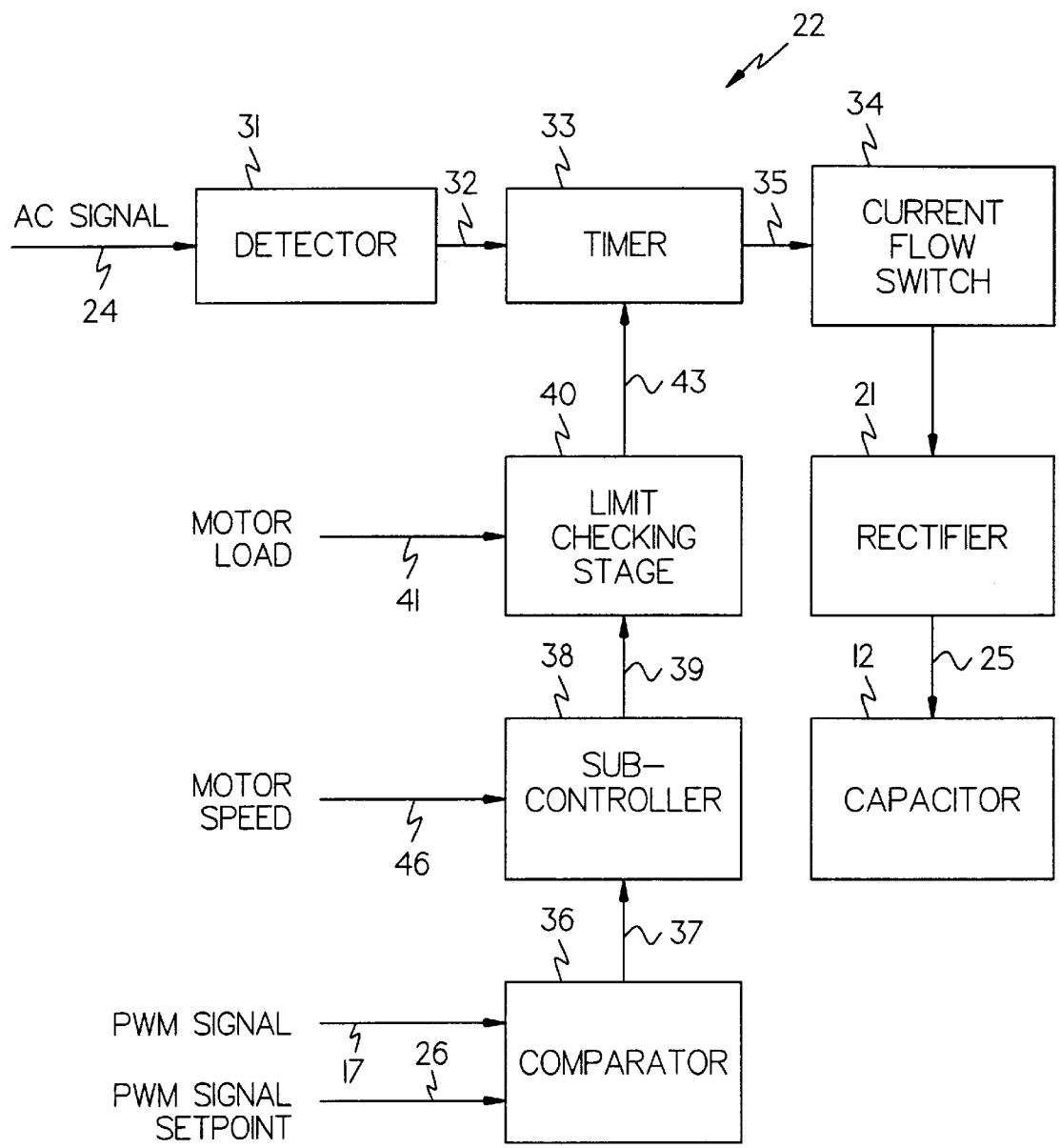
FIG. 3 is a schematic diagram of the components comprising the controller of the invention.

As shown in FIG. 3, for the embodiment of the invention being described, controller 22 includes a detector 31 to which the AC voltage signal is conducted along lines 18. Detector 31 produces a zero-crossing signal on line 32 representing zero-crossing points of the AC voltage signal. A timer 33 is actuated in response to the zero-crossing signal, and a current flow switch 34 is responsive to timer 33 and coupled to rectifier 21 for controlling passage of the rectified AC signal to capacitors 12. In particular, timer 33 may be actuated at each zero-crossing of the AC voltage signal and current flow switch 34 may be actuated at each expiration of the timer, which is indicated by a signal on line 25. Timer 33 may have adjustable duration, with the duration being adjustable in response to a limit checking stage 40, as described below. Current flow switch 34 may be a thyristor.

Controller 22, as shown in FIG. 3, also includes a comparator 36 for comparing the PWM signal on line 17 with the PWM signal setpoint on line 26. Comparator 36 generates an error term along line 37 representing the difference between the PWM signal and the PWM signal setpoint.

Controller 22, as shown in FIG. 3, also includes calculating means responsive to the difference between the PWM signal and the PWM setpoint for calculating a firing angle for the thyristor current flow switch. Such means are represented by subcontroller 38, which receives as input a signal on line 46 representing the current motor speed and a signal on line 37 representing the error term from comparator 36. As shown in FIG. 4, the calculating means, namely subcontroller 38, can include a fuzzy logic controller 44 for receiving a signal representing the error term on line 37 and for producing a fuzzy output representing the firing angle for the thyristor 34. The calculating means can also include a defuzzification stage 45 responsive to the fuzzy output for producing a crisp output on line 39 representing the firing angle of the thyristor. A fuzzy logic implementation offers the advantage of adjusting the PWM signal supplied to the DC motor M without requiring a rigorous mathematical model of the entire circuit 20. Instead, fuzzy logic provides an intuitive approach, much like a human operator would use if manually adjusting the PWM signal.

The following rules are examples of suitable rules that may be executed by the fuzzy logic controller 44:

1. If PMW is low and speed is low then capacitor voltage is moderate.
2. If PMW is low and speed is high then capacitor voltage is low.
3. If PWM is moderate and speed is low then capacitor voltage is high.
4. If PWM is moderate and speed is high then capacitor voltage is moderate.
5. If PWM is high and speed is low then capacitor voltage is moderate.
6. If PWM is high and speed is high then capacitor voltage is low.

The AND and OR statements in the above rule set represent mathematical evaluations of fuzzy AND and fuzzy OR functions on fuzzified results of the process variables. The THEN statement represents the fuzzy OR of all conditions contributing to a specific output. For example, rules 1, 4 and 5 contribute to a result of capacitor voltage being moderate. The outputs of these three rules may pass through a fuzzy OR before being processed by the defuzzification stage 45.

The process variables "PWM" and "speed" may be fuzzified with known pyramidal membership functions for simplicity, and the fuzzy AND and fuzzy OR operators may be based on established min-max techniques. The defuzzification stage 45 may be based on a known weighted center of gravity calculation. These fuzzy logic techniques are well-known to those skilled in the art, and will not be further described here. If a fuzzy logic approach is chosen, the output of the defuzzification stage 45 on line 39 is a crisp value representing a requested thyristor firing angle.

Controller 22, as shown in FIG. 3, also includes a limit checking stage 40 coupled to subcontroller 38 for comparing the requested firing angle of the thyristor, received on line 39, to a range of limits and, if the firing angle falls outside this range, to place the firing angle inside this range. The requested thyristor firing angle equates to a requested capacitor voltage, since the firing angle of the thyristor controls the duration of adjustable timer 33 and determines how much of the AC input waveform is rectified by rectifier 21 and fed along line 25 to capacitors 12.

Limit checking stage 40 receives a signal on line 41 representing the current motor load and a signal on line 39 representing the requested thyristor firing angle, and outputs a thyristor firing angle that is corrected as necessary to ensure proper operation of DC motor M at a given load point. For example, if the firing angle is too great and the capacitor voltage is allowed to drop too low, the capacitors 12 will discharge and the DC motor M will not operate properly under a heavy transient load when the control switch 13 is closed. Conversely, if the firing angle is too low, the thyristor will not conduct properly and power will be applied unevenly to the DC motor M. Thus, control of the capacitor voltage is dictated by the fuzzy logic rules above.

The limit checking stage 40 operates by receiving a signal representing the current motor load on line 41 and a signal representing the requested firing angle of the thyristor on line 39, by equating the firing angle to a requested capacitor voltage, and by equating the range of limits to an upper limit capacitor voltage and a lower limit capacitor voltage at which the DC motor will operate properly at the current motor load. Limit checking stage 40 evaluates whether the requested or proposed capacitor voltage falls between the upper limit capacitor voltage and the lower limit capacitor voltage, and, if not, places the proposed capacitor voltage, and thus the requested thyristor firing angle, between the upper limit and the lower limit. The specific details of this operation, such as the ability of a given DC motor M to operate effectively at a given load point and a given capacitor voltage, are application-defined and are not discussed further here. The corrected thyristor firing angle is passed to timer 33 along line 43.

Method of Operation and Examples

The method employed by the present invention will now be described and illustrated with examples.

Referring to FIG. 2, with the DC motor M running at a steady-state speed, the PWM generating means (namely motor speed control loop 14) synthesize a PWM signal on line 15 corresponding to that steady-state speed. The controller 22 then compares the PWM signal on line 17 to a user-derived signal setpoint on line 26. The controller 22 then adjusts the voltage across capacitors 12 in response to the difference between the PWM signal and the PWM signal setpoint. By adjusting the capacitor voltage in this manner, the controller 22 indirectly manipulates the speed of the DC motor M away from its former steady-state speed. The motor speed control loop 14 senses that the speed of the DC motor M has changed from its steady-state speed, and seeks to restore the steady state speed of the DC motor M by adjusting the PWM signal fed to control switch 13. The motor speed control loop 14 calculates a new PWM signal and supplies it to control switch 13 via line 16. In response to the new PWM signal, the speed of the DC motor M returns to its steady-state speed, which then satisfies the motor speed control loop 14. Thus, the controller 22 indirectly adjusts the PWM signal by temporarily altering the speed of motor M by manipulating the capacitor voltage.

The controller 22 may execute the above method one or more times, depending on the magnitude of the difference between the current PWM signal and the PWM signal setpoint, until the PWM signal conforms approximately with the PWM signal setpoint. It is to be understood that the PWM signal on line 17 and the PWM signal setpoint on line 26 may or may not conform with absolute mathematical precision. At some point, the differences between the two values may be too insignificant to justify another iteration of the above method. Thus, the term "conform" in the context of this application does not convey a rigid, absolute standard, but rather a flexible standard adaptable to the requirements of different environments.

The controller 22 operates in principle by incrementally urging the PWM signal on line 17 toward the PWM signal setpoint on line 26. Even if the controller 22 overshoots the PWM signal setpoint, it can correct the overshoot by driving the PWM signal in the opposite direction. The detailed operation of the controller 22 will now be described with reference to two exemplary scenarios.

As a first scenario, consider the case when the current PWM signal on line 17 is higher than the PWM signal setpoint on line 26. For example, assume that the DC motor M is running in steady-state, and that the desired PWM signal setpoint is 50% duty cycle, while the current PWM signal is 80% duty cycle. In this case, the controller 22 seeks to reduce the current PWM signal downwards to approximately 50% duty cycle. To meet this goal, the controller 22 increases the capacitor voltage. In response, the speed of DC motor M will increase away from its steady-state speed because of the additional capacitor voltage.

The motor speed control loop 14 will sense this increased motor speed, but will not be aware of the increased capacitor voltage. The motor speed control loop 14 will attempt to restore the steady-state speed of the motor M by modifying the PWM signal on line 16 supplied to control switch 13. Specifically, the motor speed control loop 14 will attempt to slow-down the motor M by decreasing the duty cycle of the PWM signal on line 16 in response to the increased motor speed. Thus, the motor speed control loop 14 calculates a new, decreased duty cycle for the PWM signal on line 16 and supplies this decreased PWM signal to control switch 13. In response to this decreased PWM signal, the speed of the DC motor M decreases and returns to its steady-state speed. Thus, the controller 22 indirectly achieves its objective of reducing the current duty cycle of the PWM signal on line 16 by raising the capacitor voltage, increasing the motor speed temporarily, and causing the motor speed control loop 14 to decrease the duty cycle of PWM signal in response to the increased motor speed.

As a second scenario, consider the case when the current PWM signal on line 17 is lower than the PWM signal setpoint on line 26. For example, assume that the DC motor M is running in steady-state, and that the desired PWM signal setpoint is 50% duty cycle, while the current PWM signal is 30% duty cycle. In this case, the controller 22 seeks to increase the duty cycle of the current PWM signal upwards to approximately 50%. To meet this goal, the controller 22 decreases the capacitor voltage. In response, the motor speed will decrease away from its steady-state speed because of the decreased capacitor voltage.

The motor speed control loop 14 will sense this decreased motor speed, but will not be aware of the decreased capacitor voltage. The motor speed control loop 14 will attempt to restore the steady-state speed of the DC motor M by modifying the PWM signal on line 16 supplied to control switch 13. Specifically, the motor speed control loop 14 will attempt to speed-up the DC motor M by increasing the duty cycle of the PWM signal on line 16 in response to the decreased motor speed. Thus, the motor speed control loop 14 calculates a new PWM signal having increased duty cycle and supplies this increased PWM signal on line 16 to control switch 13. In response to the increased duty cycle of the PWM signal, the speed of the DC motor M increases and returns to its steady-state speed. Thus, the controller 22 indirectly achieves its objective of increasing the duty cycle of the current PWM signal on line 16 by decreasing the capacitor voltage, decreasing the motor speed temporarily, and causing the motor speed control loop 14 to increase the duty cycle of the current PWM signal in response to the decreased motor speed.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A circuit for driving a DC motor comprising:
   a control switch adapted for connection in series with the DC motor to control current flow through the DC motor;
   means for supplying an AC voltage signal;
   a rectifier for rectifying said AC voltage signal;
   a capacitor:
      (a) coupled in parallel with the DC motor and said control switch,
      (b) responsive to the rectified AC voltage signal, and
      (c) across which a voltage is developed for controlling the speed of the DC motor;
   means responsive to the DC motor for:
      (a) generating a pulse-width modulated (PWM) signal having a duty cycle related to the speed of the DC motor, and
      (b) conducting said PWM signal to said control switch to control said control switch; and
   a controller having a PWM signal setpoint and responsive to said PWM signal and said AC voltage signal for:
      (a) comparing said PWM signal with said PWM signal setpoint, and
      (b) controlling the voltage across said capacitor in response to the comparison between said PWM signal and said PWM signal setpoint.

2. The circuit of claim 1, wherein said controller includes:
   (a) a detector to which the AC voltage signal is conducted for producing a zero-crossing signal representing zero-crossing points of the AC voltage signal,
   (b) a timer actuated in response to said zero-crossing signal, and
   (c) a current flow switch responsive to said timer and coupled to said rectifier for controlling passage of the rectified AC voltage signal to said capacitor.

3. The circuit of claim 2, wherein said timer is actuated at each zero-crossing of the AC voltage signal and said current flow switch is actuated at each expiration of said timer.

4. The circuit of claim 2, wherein said current flow switch is a thyristor.

5. The circuit of claim 1, wherein said controller includes:
   (a) a comparator for comparing said PWM signal with said PWM signal setpoint,
   (b) a detector to which the AC voltage signal is conducted for producing a zero-crossing signal representing zero-crossing points of the AC voltage signal,
   (c) a timer actuated in response to said zero-crossing signal,
   (d) a thyristor responsive to said timer and coupled to said rectifier for controlling passage of the rectified AC signal to said capacitor,
   (e) means responsive to the difference between said PWM signal and said PWM signal setpoint for calculating a firing angle for said thyristor, and
   (f) a limit checking stage coupled to said calculating means for comparing said firing angle to a range of limits, and if said firing angle falls outside said range, to place said firing angle inside said range.

6. The circuit of claim 5, wherein said calculating means includes:
   (a) a fuzzy logic controller for producing a fuzzy output representing said firing angle, and
   (b) a defuzzification stage responsive to said fuzzy output for producing a crisp output representing said firing angle.

7. The circuit of claim 6, wherein said limit checking stage:
  (a) receives a signal representing the current motor load;
  (b) equates said firing angle to a proposed capacitor voltage;
  (c) equates said range of limits to an upper limit capacitor voltage and a lower limit capacitor voltage between which said DC motor will operate properly at said current motor load; and
  (d) evaluates whether said proposed capacitor voltage falls between said upper limit capacitor voltage and said lower limit capacitor voltage, and if not, places said proposed capacitor voltage between said upper limit capacitor voltage and said lower limit capacitor voltage.

8. A circuit for driving a DC motor comprising:
  a control switch adapted for connection in series with the DC motor to control current flow through the DC motor;
  a capacitor coupled in parallel with the DC motor and said control switch, the speed of the motor being dependent upon the voltage across said capacitor;
  means for generating a pulse-width modulated (PWM) signal in response to the speed of the DC motor and conducting said PWM signal to said control switch to control said switch;
  means for supplying an AC signal;
  a rectifier for rectifying said AC signal and passing a rectified signal to said capacitor to control the voltage across said capacitor; and
  a controller being responsive to said PWM signal and said AC signal and having a PWM signal setpoint and including:
    a comparator comparing said PWM signal with said PWM signal setpoint and generating an output signal representing the difference between said PWM signal and said PWM signal setpoint;
    means for calculating a firing angle based on the difference between said PWM signal and said PWM signal setpoint;
    a limit checking stage receiving said firing angle and adjusting said firing angle to be within a range;
    a detector receiving said AC signal and producing a zero-crossing point signal for said AC signal;
    a timer having adjustable duration and starting in response to said zero crossing point signal, the duration of the timer being adjustable in response to said signal from said limit checking stage; and
    a thyristor firing in response to the expiration of said timer to activate said rectifier to pass said rectified signal to said capacitor.

9. The circuit of claim 8, wherein said controller includes a sub-controller calculating a firing angle for said thyristor based on said output signal from said comparator.

10. The circuit of claim 9, wherein said sub-controller uses fuzzy logic to calculate said firing angle.

11. A method of driving a DC motor comprising the steps of:
  a) running a DC motor at a steady-state speed;
  b) generating a pulse-width modulated (PWM) signal corresponding to the steady-state speed of the DC motor;
  c) comparing the PWM signal to a PWM signal setpoint;
  d) adjusting the voltage across a capacitor coupled to the DC motor in response to the difference between the PWM signal and the PWM signal setpoint;
  e) adjusting the speed of the DC motor away from the steady-state speed in response to the capacitor voltage;
  f) adjusting the PWM signal toward the PWM signal setpoint in response to the speed of the DC motor; and
  g) returning the speed of the DC motor to the steady-state speed in response to the PWM signal.

12. The method of claim 11, further comprising the step of repeating steps (a) through (g) until the PWM signal conforms to the PWM setpoint.

13. The method of claim 11, wherein the step of comparing includes comparing the PWM signal to a PWM signal setpoint representing a 50% duty cycle.

14. The method of claim 11, wherein adjusting the capacitor voltage includes increasing the capacitor voltage in response to the PWM signal being higher than the PWM signal setpoint.

15. The method of claim 11, wherein adjusting the capacitor voltage includes decreasing the capacitor voltage in response to the PWM signal being lower than the PWM signal setpoint.

16. The method of claim 11, wherein adjusting the motor speed includes increasing the motor speed in response to an increased capacitor voltage.

17. The method of claim 11, wherein adjusting the motor speed includes decreasing the motor speed in response to a decreased capacitor voltage.

18. The method of claim 11, wherein adjusting the PWM signal includes decreasing the PWM signal in response to an increased motor speed.

19. The method of claim 11, wherein adjusting the PWM signal includes increasing the PWM signal in response to a decreased motor speed.

20. The method of claim 11, wherein returning the speed of the DC motor to the steady-state speed includes decreasing the motor speed toward the steady-state speed in response to a decreased PWM signal.

21. The method of claim 11, wherein returning the speed of the DC motor to the steady-state speed includes increasing the motor speed toward the steady-state speed in response to an increased PWM signal.

* * * * *